United States Patent [19]

Rinde et al.

[11] 4,252,936

[45] Feb. 24, 1981

[54] USE OF 2,5-DIMETHYL-2,5-HEXANE DIAMINE AS A CURING AGENT FOR EPOXY RESINS

[75] Inventors: James A. Rinde, Livermore; Herbert A. Newey, Lafayette, both of Calif.

[73] Assignee: The United States of America as represented by the United States Department of Energy, Washington, D.C.

[21] Appl. No.: 5,940

[22] Filed: Jan. 24, 1979

[51] Int. Cl.³ .............................................. C08G 59/50
[52] U.S. Cl. ............................... 528/121; 260/18 EP; 525/507; 528/124; 528/341; 528/407
[58] Field of Search ............... 528/121, 124, 135, 341, 528/407; 260/18 EP; 525/507

[56] References Cited

U.S. PATENT DOCUMENTS

| 2,500,600 | 3/1950 | Bradley | 260/47 |
| 2,865,888 | 12/1958 | Greenlee | 260/47 |

OTHER PUBLICATIONS

Garnish, "Chemistry & Properties of Epoxy Resins", *Composite*, May 1972, pp. 104-111.

*Primary Examiner*—Earl A. Nielsen
*Attorney, Agent, or Firm*—James E. Denny; Roger S. Gaither; William S. Bernheim

[57] ABSTRACT

Primary diamines of the formula

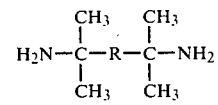

wherein R is a straight chain saturated hydrocarbon of 2 to 4 carbons, a disubstituted benzene ring, or disubstituted dibenzo methane for use as a curing agent for epoxy resins. These curing agents can be used to form epoxy resin mixtures useful in filament winding and pre-impregnated fiber molding and in formulating film adhesives, powder coatings and molding powders. The epoxy mixtures form for such uses as room temperature non-reacting, intermediate stable state which has a latent cross-linking capability.

9 Claims, No Drawings

USE OF 2,5-DIMETHYL-2,5-HEXANE DIAMINE AS A CURING AGENT FOR EPOXY RESINS

BACKGROUND OF THE INVENTION

The invention described herein was made in the course of, or under, Department of Energy Contract No. W-7405-ENG-48 with the University of California.

This invention relates to the use of certain sterically hindered symmetrical diamines as curing agents for epoxy resins. In particular, the resulting epoxy resin mixtures are useful in filament winding and preimpregnated fiber molding and in formulating film adhesives, molding compounds and powder coatings.

Thermoset (polymerized and cross-linked) epoxy resins have been used as a matrix in fiber reinforced composites. One example is in filament winding. Fiber strands are immersed in a resin mixture, which includes an epoxy resin and a curing agent for the resin, and then wound on a mandrel and cured. Another example is in "preimpregnated fiber" molding. Fibers or cloth are coated with a resin mixture in a manner such that the resin mixture is cured to an intermediate stable state. Subsequently, the resin is thermoset. That is, curing is reinitiated by heat in a manner allowing the resin mixture in the impregnated fibers to liquefy, flow and cure.

For filament winding, the gel time of the resin mixture is a critical characteristic. Gel time is the elapsed time between initial mixing of the epoxy resin and the curing agent (to form a liquid mixture) and the mixture curing to an amorphous solid state, i.e., no longer pourable. Gel time can be somewhat adjusted with temperature and solvents.

Gel times of at least 10 hours and preferably on the order of 20 hours are sought for filament winding purposes. Although epoxy resin mixtures including an aromatic diamine as the curing agent have sufficiently-long gel times, resin mixtures including an aliphatic diamine as the curing agent have not had acceptably-long gel times. The gel times of the latter mixtures are generally less than one hour; this time has been lengthened in some cases to seven hours for some sterically hindered amines.

For pre-impregnated fiber molding, the epoxy resin mixture must exhibit an intermediate stable state. This state can occur if reaction conditions can produce a cure which follows a sequential course, linear polymerization and subsequent cross-linking of the linear polymers. The object is a linear polymerization which yields a glassy solid which prevents further curing, linear polymerization or cross-linking, until reinitiated.

In the typical application, an intermediate composite is formed by coating a woven fiber with a resin mixture and curing the resin mixture to the intermediate state. This intermediate composite is solid and transportable. At the desired time this intermediate composite is molded by reestablishing ductility and reinitiating the curing. The curing is normally reinitiated by use of heating. This second curing results in a composite containing a linearly-polymerized and cross-linked resin product.

Many manufacturers employ such pre-impregnated fibers. The manufacturer is assured of proper proportions and good mixing and further avoids dealing with epoxy mixtures as liquids.

Resin mixtures in which the curing agent has been an aromatic diamine or a non-symmetrical alicyclic diamine have exhibited an intermediate stable state. However, the conditions under which the intermediate state is formed require that continued refrigeration be used to prevent reinitiation of the curing. (Actually, the curing of these mixtures is believed to be greatly slowed, rather than stopped, and shelf-lives, even under refrigeration, are normally less than 6 months). An example of a non-symmetrical alicyclic diamine is 1,8-diamino-p-menthane

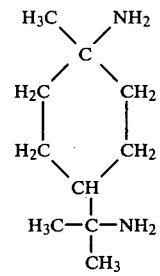

Unfortunately, resin mixtures containing aromatic amines may be banned because of known and suspected carcinogenity of the aromatic amines. Thus, new resin mixtures are needed for filament winding and for pre-impregnated fiber molding.

Accordingly, an object of this invention is a non-aromatic diamine curing agent forming epoxy resin mixtures which exhibit gel times of sufficient length so that the mixtures are useful in filament winding.

Another object of this invention is a non-aromatic diamine curing agent forming epoxy resin mixtures which exhibit an intermediate stable state so that the mixtures are useful in pre-impregnated fiber molding.

Yet another object of this invention is a curing agent which is not highly toxic or suspected of carinogenicity.

Other objects of the invention will become apparent from the following description.

SUMMARY OF THE INVENTION

Symmetrical diamines of the formula:

$$H_2N-\underset{\underset{CH_3}{|}}{\overset{\overset{CH_3}{|}}{C}}-R-\underset{\underset{CH_3}{|}}{\overset{\overset{CH_3}{|}}{C}}-NH_2$$

where R is selected from straight chain saturated hydrocarbons of 2 to 4 carbons,

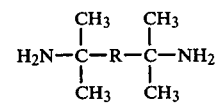

(1,3-and 1,4-disubstituted benzene rings), and

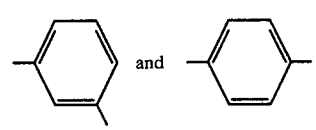

(4,4'-disubstituted diphenyl methane) are useful as curing agents for epoxy resins. In particular, the use of 2,5-dimethyl-2,5-hexane diamine is preferred.

These curing agents can be employed to form resin mixtures for use in filament winding and in pre-impregnated fiber molding. With respect to the intermediate stable state, such state has the added advantage of being stable at room temperature.

DETAILED DESCRIPTION OF THE PREFERRED EMBODIMENT

Most epoxy resins should be curable with the described amines. Epoxy resin denotes a compound including one or more

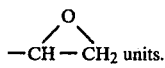

units.

The preferred epoxy resin is the standard epoxy resin, diglycidyl ether of bisphenol A (DGEBA),

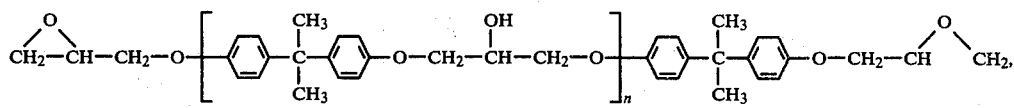

n varies from about 0 to 10 and is commonly about 0. Other useful epoxy resins include: diglycidyl ether of bisphenol F (DGEBF),

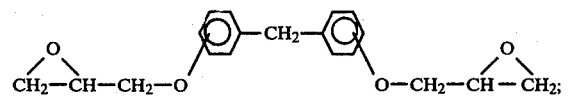

resorcinol diglycidyl ether,

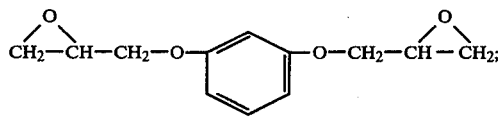

aliphatic polyepoxide ester of linoleic dimer acid,

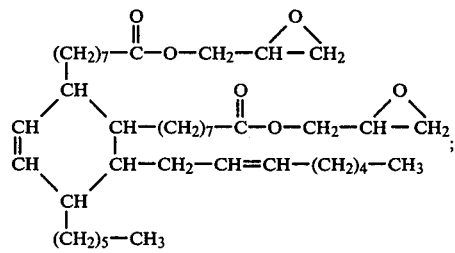

polyglycol diepoxides,

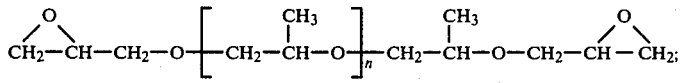

n varies from about 0–5; and epoxy novolac resins,

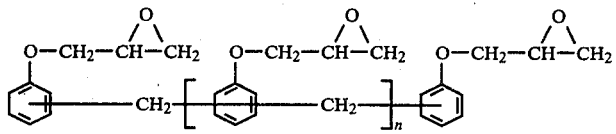

n varies from about 0.2–1.8.

In commercial preparations, these epoxy resins are often mixed with diluents. Additional information on epoxy resins and diluents is set forth in "Properties of Epoxy Resins Used in Wet Filament Winding" Lawrence Livermore Laboratory, UCID-17219, 1976, Livermore, California.

Representative of the resin mixtures which can be formed, 100 grams of pure diglycidyl ether of bisphenol A (DGEBA) is mixed with from 17 to 26 grams of 2,5 dimethyl 2,5 hexane diamine (DMHDA). Preferred are mixtures having 20 to 24 grams of DMHDA and more preferably about 21.8 grams, the stoichiometric amount, or about 24 grams, a 10% excess. The above mixtures are pure; solvents and diluents are unneeded. At room temperature the components are liquid, and upon mixing, curing will be initiated and is mildly exothermic.

DGEBA and DMHDA are both commercially available. In particular, DMHDA is available from Aldrich Chemical Company, 940 W. Saint Paul Ave. Milwaukee, Wisconsin 53233.

The gel times of the resin mixtures are sufficiently long for filament winding purposes. The gel time for a stoichiometric DGEBA/DMHDA mixture (to the intermediate state) was about 21 hours. The initial viscosity of this resin mixture was also favorable at 0.5 Pa.s.

The filament winding generally consists of forming the resin mixture, immersing a glass, aramid or carbon fiber (of from about 1–3 mm in diameter) in the mixture for about 1 sec., winding the wet fiber on a mandrel, and, subsequently, further curing with heat the composite which includes the resin mixture and the fiber.

At room temperature, about 25° C., the resin mixtures will cure to an intermediate state in which the mixtures become a hard brittle solid. An analysis of a 100/24 DGEBA/DMHDA mixture showed the intermediate state to be stable at room temperature for at least 3 months. In fact, the curing appears to actually stop rather than slow greatly (as is the case with aromatic amine curing agents). The curing stopped before all the primary amines had reacted (linear polymerization) and without indication of the secondary amines having reacted (cross-linking). Other testing on a 100/21.8 DGEBA/DMHDA mixture has shown that cross-linking does not occur, with or without elevated temperatures, until 50% of the epoxy groups have reacted.

This intermediate stable state exhibited by the resin mixtures make them especially useful for pre-impregnated fiber purposes. The intermediate states remain stable at room temperature; refrigeration is not necessary. Shelf lives at room temperatures of at least 3 years are anticipated. Further, because cross-linking does not occur at elevated temperatures until 50% of the epoxy groups are reacted, the initial curing rate can be increased with heating without adversely affecting the intermediate state, no cross-linking occurs.

The pre-impregnated fiber, an intermediate composite, is generally formed by coating uni-direction fibers or woven fiber with one of the described resin mixtures and curing the mixture to the intermediate state. At the desired time, the intermediate composite can be molded. Final curing is initiated by heating (generally starts about 50° C.) at which point the solid softens sufficiently to permit shaping of the coated fiber. Higher temperatures, on the order of 125° C. during the final cure, increase the ductility and improve the strength of the resulting solid composite. During this final cure cross-linking and additional linear polymerization occur.

The properties of fully cured resin mixtures are good. The tensile strength of a stoichiometric (100 gram/21.8 gram) DGEBA/DMHDA composite is 86 MPA (12,500 psi) and the glass transition temperature was greater than 140° C. when the mixture was cured at 130° C.

The reaction scheme for a DGEBA/DMHDA mixture is shown below:

reactivity of the amine group. The reactivity of the first hydrogen substituted for (linear polymerization) in the —NH$_2$ group has been found to be on the order of 50-60 times greater than that of the second hydrogen (cross-linking). By contrast, in an unhindered aliphatic amine, such as, diethylene triamine, the difference in reactivity is on the order of 2 times; in an aromatic amine, such as, methylene dianiline the difference is on the order of 7 to 12 times.

Thus, a number of useful non-aromatic diamines have been disclosed. The disclosed symmetrical diamines, which include saturated aliphatic diamines, are useful as curing agents for epoxy resins. The epoxy resin mixtures formed have properties useful in filament winding and pre-impregnated fiber molding.

These same properties, including the intermediate stable state, also make the epoxy resin mixtures useful in formulating film adhesives, molding compounds and powder coatings. These formulations may in fact be the most important use to which the described mixtures are put.

What we claim is:

1. An intermediate stable material having a stability at room temperature of at least about 3 months comprising a fusible brittle solid product of a partially cured mixture of about equivalent amounts of an epoxy resin and a diamine of the formula:

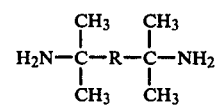

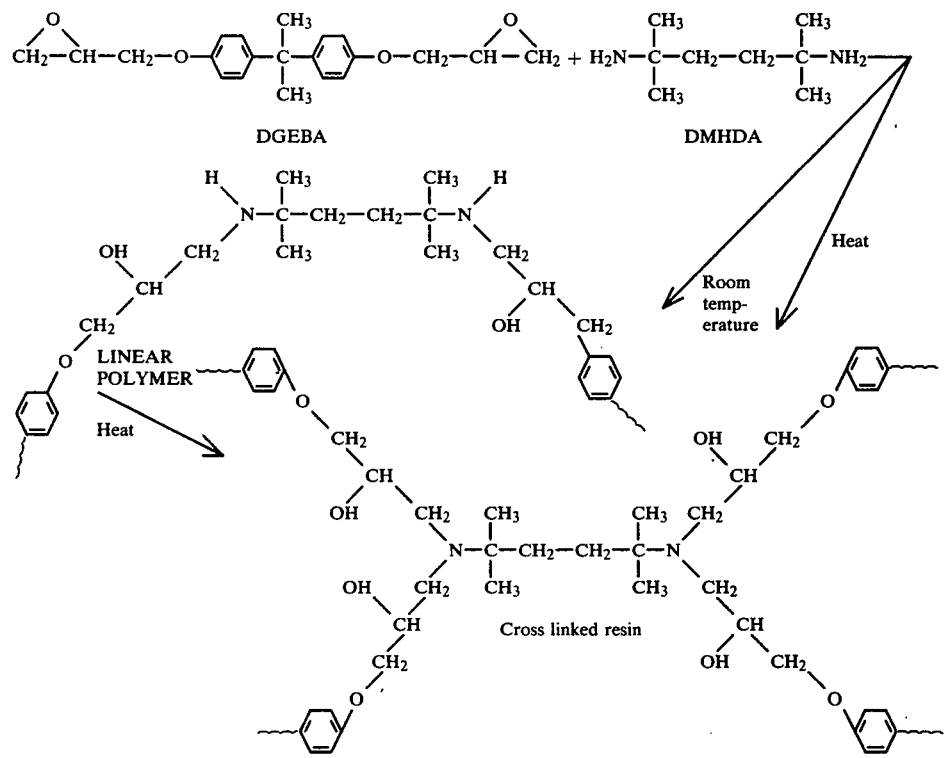

The stable intermediate appears to be the result of the steric hindrance of the amine group. The amine group is attached to a tertiary carbon atom to which two methyl groups are attached. These methyl groups hinder the wherein R is selected from a straight chain saturated hydrocarbon of 2-4 carbons; 1,3- and 1,4-disubstituted benzene rings and 4,4'-disubstituted diphenyl methane.

2. An intermediate material according to claim 1 wherein R is a straight chain saturated hydrocarbon of 2-4 carbons.

3. An intermediate material according to claim 2 wherein the diamine compound is 2,5-dimethyl-2,5-hexane diamine.

4. An intermediate material according to claim 3 wherein the epoxy resin is diglycidyl ether of bisphenol A.

5. An intermediate material according to claim 1 further including fibers.

6. A process of reacting about equivalent amounts of an epoxy resin and a diamine of the formula:

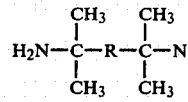

wherein R is selected from a straight chain saturated hydrocarbon of 2-4 carbons; 1,3- and 1,4-disubstituted benzene rings and 4,4'-disubstituted diphenyl methane to form an intermediate stable material having a stability at room temperature of at least about 3 months comprising mixing said resin and said diamine and reacting at a temperature and time selected to provide for polymerization to occur but no substantial crosslinking to occur.

7. The process of according to claim 6 wherein the temperature is selected to be about room temperature and the time is selected to be about 1 hour.

8. A material according to claim 1 wherein the mixture comprises about 20-24 grams of diamine per 100 grams of diglycidyl ether of bisphenol A.

9. A process according to claim 6 wherein the resin is diglycidyl ether of bisphenol A and the equivalence is about 20-24 grams of the diamine per 100 grams of diglycidyl ether of bisphenol A.

* * * * *